United States Patent
Blair et al.

(10) Patent No.: US 12,470,421 B2
(45) Date of Patent: Nov. 11, 2025

(54) DATA ANALYTICS PLATFORM FOR STATEFUL, TEMPORALLY-AUGMENTED OBSERVABILITY, EXPLAINABILITY AND AUGMENTATION IN WEB-BASED INTERACTIONS AND OTHER USER MEDIA

(71) Applicant: AGBLOX, INC., Irvine, CA (US)

(72) Inventors: Thomas N. Blair, Irvine, CA (US); Alexey Goder, San Jose, CA (US); Joerg Rings, Vancouver, WA (US); Joshua Peter Francis Yoder, Rochester, NY (US); Spyros J. Lazaris, Los Angeles, CA (US); Gregory Burlet, Edmonton (CA)

(73) Assignee: AGBLOX, INC., Irvine, CA (US)

( * ) Notice: Subject to any disclaimer, the term of this patent is extended or adjusted under 35 U.S.C. 154(b) by 0 days.

(21) Appl. No.: 18/379,118

(22) Filed: Oct. 11, 2023

(65) Prior Publication Data

US 2024/0121125 A1    Apr. 11, 2024

Related U.S. Application Data

(60) Provisional application No. 63/415,266, filed on Oct. 11, 2022.

(51) Int. Cl.
| | |
|---|---|
| *H04L 12/18* | (2006.01) |
| *G06F 16/34* | (2025.01) |
| *G06F 40/58* | (2020.01) |
| *G06V 20/20* | (2022.01) |
| *G06V 20/40* | (2022.01) |

(52) U.S. Cl.
CPC ........ *H04L 12/1831* (2013.01); *G06F 16/345* (2019.01); *G06F 40/58* (2020.01); *G06V 20/47* (2022.01)

(58) Field of Classification Search
CPC ... H04L 12/1831; G06F 16/345; G06F 40/58; G06V 20/47
See application file for complete search history.

(56) References Cited

U.S. PATENT DOCUMENTS

| | | | | |
|---|---|---|---|---|
| 10,055,202 | B2* | 8/2018 | Peed | G06F 8/34 |
| 11,232,267 | B2* | 1/2022 | Han | G16H 70/00 |
| 11,288,453 | B1* | 3/2022 | Vinicombe | G06F 40/284 |
| 11,615,799 | B2* | 3/2023 | Zhu | G06F 16/345 |
| | | | | 704/235 |
| 2021/0294970 | A1* | 9/2021 | Bender | G06F 16/3329 |
| 2022/0164683 | A1* | 5/2022 | Hao | G06F 16/35 |
| 2022/0292262 | A1* | 9/2022 | Japa | G06N 5/041 |
| 2022/0351716 | A1* | 11/2022 | Kim | G10L 25/30 |
| 2023/0260307 | A1* | 8/2023 | Reisman | G06N 5/045 |
| | | | | 382/157 |
| 2023/0385778 | A1* | 11/2023 | Johnson, III | G06Q 10/1095 |
| 2024/0062014 | A1* | 2/2024 | Sreedhar | G06F 40/35 |
| 2024/0184829 | A1* | 6/2024 | Roy | G06F 16/243 |

* cited by examiner

*Primary Examiner* — Nazia Naoreen
(74) *Attorney, Agent, or Firm* — LAZARIS IP

(57) ABSTRACT

A data modeling and analytics platform augments and annotates content captured from a user's online interactions and other documents. The data modeling and analytics platform is performed within a machine learning and artificial intelligence-based processing environment that enables observability, explainability, and data analytics for dynamic information discovery over time within a user library that includes files representing the online interactions and documents containing information of user interest.

27 Claims, 3 Drawing Sheets

DATA ANALYTICS PLATFORM FOR STATEFUL, TEMPORALLY-AUGMENTED OBSERVABILITY, EXPLAINABILITY AND AUGMENTATION IN WEB-BASED INTERACTIONS AND OTHER USER MEDIA

CROSS-REFERENCE TO RELATED PATENT APPLICATION(S)

This patent application claims priority to U.S. provisional patent application 63/415,266, filed on Oct. 11, 2022, the contents of which are incorporated in its entirety herein. In accordance with 37 C.F.R. § 1.76, a claim of priority is included in an Application Data Sheet filed concurrently herewith.

FIELD OF THE INVENTION

The present invention relates to data modeling and analytics of web-based interactions and other media. Specifically, the present invention relates to a software platform that analyzes web-based interactions to perform speaker identification and generate a transcription of content, and augments the transcription with an application of knowledge graphs and artificial intelligence tools to provide observability and explainability over time.

BACKGROUND OF THE INVENTION

Technology for conducting meetings and other real-time or near real-time interactions online has existed for some time, and has recently developed and proliferated to an extent that it is now easy and common for individuals and organizations to collaborate, in real-time, from any location. Such technology provides robust audio and video capabilities, and enables the participation of many people during such meetings. Recording and transcription capabilities are also commonly available to participants and users.

Such technology however has many limitations. Despite its widespread usage, there are no robust software-based approaches to capturing deeper meeting data and extracting insight from meeting content across time. There are also no existing approaches to utilizing such deeper meeting data and insight for more advanced analysis of content to take full advantage of the depth of information that can be obtained during video meetings and other online interactions. For example, there is no way of tracking participant performance in meetings over time, or for applying other analytics or metrics to monitor meeting activity and quality. There is also no way of analyzing what transpires within one's meetings and other online interactions over time, and across many meetings or interactions.

Further, there is also no way of supplementing meeting content with other information, regardless of whether that information is collected or discerned from the meeting itself, or collected from other sources and associated with the meeting in some manner. Still further, there is no way of generating a rich contextual annotation of transcribed meeting content. For example, while sentiment and trends can be discerned from the transcript itself, there is no way of augmenting such meeting content, or the associated sentiment or trends, with information such as speaker emotion or audience emotion, distilled from either voice or video or image files.

There is also no way of augmenting such meeting content, or the associated sentiment or trends, using people and entity recognition through knowledge graphs that apply and utilize machine learning approaches to draw inferences between various data points. Additionally, there is no approach available for easily and accurately identifying speakers from voice files and images, and correlating the identification of speakers with other information in a comprehensive manner, such as an in generation of a knowledge graphs for entity recognition.

The constraints described above are also not limited to just meetings and content within meetings. There is also no existing approach to identifying content and capturing deeper information within, and extracting insight from, one's entire body of files, where such a corpus includes both recorded meetings and other any documents identified by users, regardless of platform or format, for analysis and augmentation across time.

BRIEF SUMMARY OF THE INVENTION

The present invention is a data modeling and analytics platform for augmenting and annotating content captured from a user's online interactions and other documents of user interest. The data modeling and analytics platform is performed within a machine learning and artificial intelligence-based processing environment that enables observability, explainability, and data analytics for dynamic information discovery over time in the conduct of the user's online interactions, such as for example meetings, and in other information provided by a user in the other documents of user interest.

This data modeling and analytics platform allows for recognition of individual speakers during such online interactions and generates transcriptions and variable-length summaries that are either by-topic, by-speaker, or both. Further, the data modeling and analytics platform includes personalized software agents that provide translation and multi-modal content output that includes sentiment analysis, annotated meeting notes, entity recognition, integration of public and private datasets, summarization, and participant interaction and performance analysis for events such as monitoring and summarizing teams, corporate meetings, sales presentations, webinars, conferences, training, and many other such settings and interactions.

The basic elements of the data modeling and analytics platform include implementations of machine learning in multiple artificial intelligence-based models. These models provide a transcription element, and augmented speaker identification, which includes voice-based and image-based identification of each participant. The data modeling and analytics platform also includes an implementation of knowledge graphs, which enable correlations of each participant with additional information, and provide cross-references with different data sources and the ability to find and associate different content, companies, organizations, ideas, and people, based on aggregation of such information. This augmentation adds a layer of explainability to highly in-depth information discovery as to a specific entity(ies), person(s), and topic(s). The data modeling and analytics platform further includes video and voice-based emotion analytics, and sentiment and trends analytics, of transcribed content.

The data modeling and analytics platform also includes an automated capture system which enables all of the above functions, in conjunction with the data modeling and analytics platform. The automated capture system records online interactions such as meetings, and provides recordings, thereof to the data modeling and analytics platform to execute the functions above. The automated capture system may, in one aspect of the present invention, be a software-based tool in the form of an agent that is a program, for use on the internet or another network, that can autonomously interact with systems or users. Regardless of its characterization, the automated captured system is configured to join an online interaction either in addition to, or in place of, a user of the data modeling and analytics platform. The automated capture system is also configured to enable upload or other ingest of additional user documents, messages, media, and other files for analyzing the information contained therein in the functions described above.

Together, these aspects of the present invention enable a contextual augmentation and amplification of large amounts of disparate types of data, regardless of the particular use case to which they are applied. More specifically, and according to one embodiment thereof, the present invention is a framework that provides rich contextual analysis of transcribed content, and broad-based temporal analytics of interactions such as meetings, as well as temporal analytics of other user-identified and/or user-provided documents and media.

It is one objective of the present invention to provide systems and methods of capturing online interactions, enabling analytics of the content therein over time, and providing augmented transcriptions thereof. It is another objective of the present invention to provide systems and methods of enabling upload or other ingest of additional user documents, messages, media, and other files for augmentation and analysis of the information contained therein. It is yet another objective to provide systems and methods of analyzing content in, and extracting information and insight from within, such online interactions, and additional user documents, messages, media, and other files (together, the user's body of documents) over time, such users are able to perform the functions described below across all of the user's body of documents in a stateful manner. It is still another objective of the present invention to provide automatic translations of transcriptions of captured online interactions.

It is yet another objective of the present invention to systems and methods of analyzing the user's body of documents using artificial intelligence-based models that are augmented with implementations of knowledge graphs that provide explainability to the information and insight extracted from the user's body of documents. It is still another objective of the present invention to provide various outputs from the temporal analytics and augmentation performed, such as for example transcriptions, summaries, translations, generative audio and video, document and presentation creation, results of semantic search tools, and others. It is still a further objective of the present invention to provide these various outputs in either customized formats at the direction of users, or in templated formats for vertical markets or particular platforms for such outputs.

Other objects, embodiments, features, and advantages of the present invention and its embodiments will become apparent from the following description of the embodiments, taken together with the accompanying drawings, which illustrate, by way of example, principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

Figure 1:
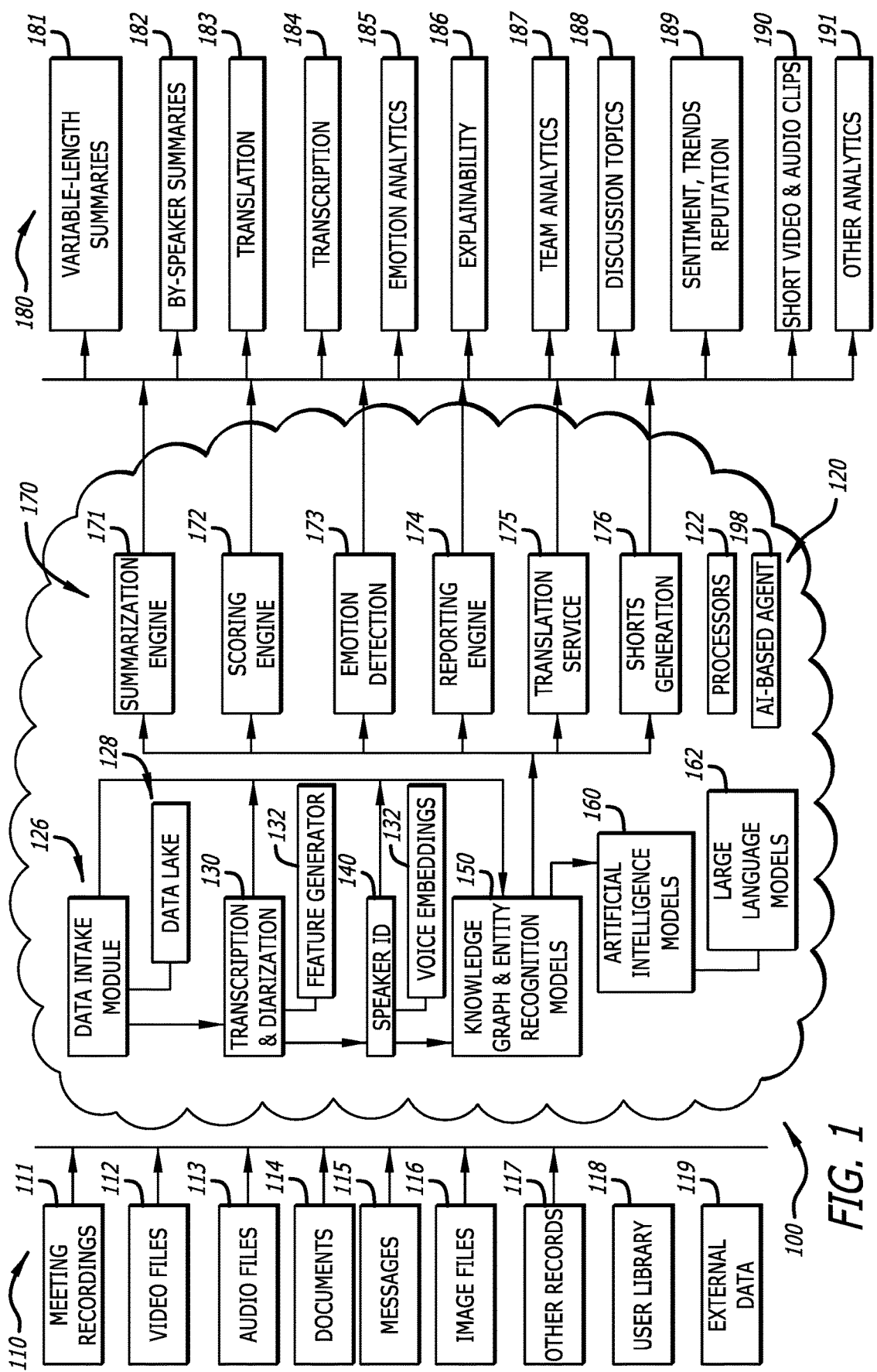
FIG. 1 is a system diagram illustrating elements of a data analytics platform according to one embodiment of the present invention.

FIG. 1 is an architecture and system diagram illustrating various aspects of a data modeling and analytics platform 100 according to the present invention. Referring to FIG. 1, the data modeling and analytics platform 100 is embodied in one or more systems and methods for dynamic information discovery within input data 110 that comprises a body of user-designated information in files representing one or both of online user interactions (meeting records), and electronic records that comprise information of user interest. The data modeling and analytics platform 100 includes a plurality of software frameworks that perform data processing functions for observability, explainability, augmentation, and data analytics for such dynamic information discovery, and include functions that generate various types of output data 180 for the user.

In one embodiment thereof, the data modeling and analytics platform 100 is applicable to the conduct of online interactions, such as for example meeting recordings 111, and such online interactions may form one aspect of the one or more files comprising the input data 110. The data modeling and analytics platform 100 is comprised, in one or more embodiments, of an automated capture system and an associated AI-based agent 198, or bot, and as noted above multiple software frameworks supporting the automated capture system and AI-based agent 198 with data processing functions for observability, explainability, augmentation, and data analytics.

Where the data analytics platform 100 is applicable to the conduct of meetings and the input data 110 includes meeting recordings 111, it enables analysis and tracking of meetings and performance over time (as well as other functions), and augmentation and annotation of meeting content. This occurs at least by analyzing voice or audio data (may also include analyzing video or image data) in the meeting recordings 111 to perform speaker identification, as well as performing entity recognition and matching, and graphing relationships based on this entity recognition and matching, and may further include identifying speaker emotion from video and voice data, to provide semantic perspective in a rich, annotated contextual analysis of transcribed content, and in temporal analytics of a user's online interactions (as well as with other electronic records that comprise information of user interest).

The data modeling and analytics platform 100 includes multiple implementations of machine learning-based artificial intelligence (AI) models 160. These AI models 160 may include many different techniques of machine learning, such as both supervised and unsupervised learning as well as instantiations of neural networks to continually enhance the data processing functions performed in the present invention, by developing and understanding relationships between various types of information. These AI models 160 may include standardized models or models developed for particular purposes, such as large language models 162, and may also include one or more models customized according to proprietary formulas. Regardless, the machine learning-based AI models 160 are comprised, at least in part, of algorithms that apply many different mathematical approaches to analyzing information and generating outputs that improve outcomes of the data modeling and analytics platform 100.

The data modeling and analytics platform 100 of the present invention is embodied within one or more systems and/or methods that are performed in a plurality of data processing modules 124 that are components within a computing environment 120 that also includes one or more processors 122 and a plurality of software and hardware components. These data processing modules 124 may be configured to run within external cloud computing environments (and accessed therefrom by the data modeling and analytics platform 100, and also may be configured to run natively on devices hosting the data modeling and analytics platform 100, such as on mobile computing devices, "smart" phones, earphones or earbuds, on other wearable, internet-enabled devices such watches and eyeglasses, and in automotive platforms. Still further, the data processing modules 124 may be configured to run within, and executed on, edge computing environments and be responsive to natural language instructions (such as for example large language models 162). The one or more processors 122 and plurality of software and hardware components are configured to execute program instructions or routines to perform the elements, modules, components, and functions described herein that together comprise and are embodied within the plurality of data processing modules 124. The words "module" and "modules" as used herein, may refer to (and the data processing modules 124 may themselves comprise, at least in part) logic embodied in hardware or firmware, or to a collection of software instructions, written in a programming language, such as, for example, Java, Python, C, or assembly. One or more software instructions for such modules 124 may be embedded in firmware. It will be appreciated that the functional data processing modules 124 may include connected logic modules, such as gates and flip-flops, and may include programmable modules, such as programmable gate arrays or processors. The data processing modules 124 described herein may be implemented as either software and/or hardware modules and may be stored in a storage device. It is to be additionally understood that the data processing modules 124, and the respective components of the present invention that together comprise the specifically-configured elements, may interchangeably be referred to as "components," "modules," "algorithms" (where appropriate), "engines," "networks," and any other similar term that is intended to indicate an element for carrying out a specific data processing function.

It is to be understood that data processing modules 124 are illustrated in FIG. 1 by their respective specific numerals, including (but not limited to) data intake module 126, transcription and diarization 130, SpeakerID 140, knowledge graph and entity recognition models 150, artificial intelligence models 160, and multiple additional processing engines 170 and 171-176.

The data processing modules 124 include a data intake module 126 that enables input data 110 to be ingested, received, requested, or otherwise obtained by the data modeling and analytics platform 100. One or more types of input data 110 may be in many different forms and formats, and may be generated by many different sources. Input data 110 may include, for example, both files that form part of a user library 118, and information in external data 119 requested by knowledge graph and entity recognition models 150 and AI models 160.

An online interaction may include any such interaction where at least one of the participants desires to have their participation recorded, and/or is not physically present. These may include, but are not limited to, meetings, interviews, podcasts, lectures, videos, and any other similar type of interaction that occurs, at least in part, using a remote or web-based hosting platform. The user library 118 may include meeting records, comprised of meeting recordings 111 and information therein. The phrase "meeting record" may herein be used to refer to any information captured by the automated capture system that is associated with a meeting recording 111.

The user library 118 may also include and/or be augmented by other types of input data 110, such as video files 112, audio files 113 (for example, other podcasts), documents 114, messages 115, image files or images 116, and other media or records 117 designated by or provided by a user. Information in external data 119 may include data provided by both public sources and private or proprietary sources.

Regardless of the source, the input data 110 may include both structured data and unstructured data for performing dynamic information discovery, together with observability, explainability, augmentation, annotation, and data analytics of content in both meeting records and other user records, within such dynamic information discovery. Structured data is information that is either already in processed format, or in an easily processable format, such as for example numerical data in form of dates, accounting data, prices of financial instruments. Unstructured data is information that is not already in a format that is processable. Unstructured data includes, but are not limited to, meetings, messages, documents, media, news reports, social media feeds, other textual information sources, audio files 113 (such as podcasts and other files in an audio format, for example microblogging feeds in audio format, and audio extracted from other file formats such as video on web-based services or sites such as, for example, YouTube™) and video files 112.

The plurality of data processing modules 124 at least include a transcription service 130, a speaker identification engine 140 (including algorithms for speaker clustering, speaker image recognition, speaker name and voice recognition), one or more knowledge graph and entity recognition models 150, and as noted above one or more machine learning-based AI models 160 (such as for example large language models 162 and other types of machine learning-based AI models 160 for performing various functions within the data processing elements 124).

The data processing modules 124 may also include multiple additional processing engines 170. These may include a summarization engine 171 that at least generates output data 180 such as, for example, summaries organized as a variable-length summary 181 and/or a by-speaker summary 182, a scoring engine 172 at least for quantifying sentiment, trends, and reputation 189, and a reporting engine 174 configured to generate templated or custom reports and other analytics 191. The additional processing engines 170 may also include an emotion detection engine 173 (at least for generating emotion analytics 185), a translation service 175 (at least for generating translations 183), and a shorts generation engine 176 for allowing users to create short video and audio clips 190. Regardless, each of the data processing modules 124 communicates with a data lake 128 that may include one or more database collections for storing and retrieving both input data 110, and information processed within such data processing modules 124. The architecture further includes one or more user interface elements, and one or more application programming interfaces (APIs) for both access to the information generated by the data modeling and analytics platform 100, and enabling the various data processing modules 124 to work together.

Together, the functions performed by these data processing modules 124 enable configuration of analytics and metrics of content within a user library 118 over time, including specific actions such as for example full text, natural language searching and queryability, whether in association with knowledge graphs for entity recognition, or for running particular, customized searches or queries using machine learning-based AI models 160. These analytics, metrics, specific actions, and other functions of the data modeling and analytics platform 100 are described in further detail below.

Transcription, Diarization and Translation

The data modeling and analytics platform 100 processes the user's files, including meeting records and other documents of comprising information of user interest, using a transcription and diarization service 130 to generate a transcription 184 of each meeting recording 111 or other file or document in the user library 118. The transcription and diarization service 130 uses, in implementation thereof, an API wrapper to abstract open source and third-party tools in the data modeling and analytics platform 100 in a multi-step process for generating a transcription 184 of content.

In one embodiment, the first such step is to apply open source-based tools (such as for example OpenAI's opensource Whisper or Meta's SeamlessM4T) to produce machine-readable transcripts that allow for identification of particular grammatical elements such as proper nouns (people, organizations, products, assets). In a further step, the data modeling and analytics platform 100 may apply an open source-based diarization module (such as for example Nvidia's opensource Nemo, or Pyannote's opensource speaker-diarization) to perform clustering of each voice activity or audio segment. An unsupervised clustering algorithm attributes each voice activity segment with a unique speaker index based on tonal features of each speaker's voice. Moreover, this clustering process identifies the number of unique speakers in the input data 110. The data modeling and analytics platform 100 may further apply other services and models for diarization, such as third-party artificial intelligence-based models that may include one or more large language models.

Outputs of the transcription and diarization service 130 from these steps are combined to produce high-quality, human readable transcripts. Together, these tools comprise at least a part of the transcription service 130 for generating transcriptions 184 of content as output data 180. Still further, the data modeling and analytics platform 100 integrates these processing steps with the speaker identification engine 140 to identify speakers and assign names, numbers, avatars, electronic mailing addresses, and other contact information where available, to the transcription 184 of the user's meeting recordings 111 and other files. The transcription 184 is also editable, so that the speaker's text may be edited along with identification of the speaker.

The transcription 184 of the content may be represented as a chat flow (with speakers' names, numbers, electronic mailing addresses, or avatars) with an original video attached and linked to timelines. This enables users to click to an appropriate message or segment, and quickly move to the video for that message or segment.

In a further step, a translation service may also be integrated with the transcription and diarization service 130 to enable reporting of transcription 184 in a translation 183 of the content into different languages. Integration of such translation services enables recording of meetings in any language, and reporting of a translation 183 of transcription 184 of the content (and augmentations and annotations thereof) in any other language.

Speaker Identification Engine

The data modeling and analytics platform 100 also includes, as noted above, a speaker identification engine 140 that is configured to perform an identification process for speakers in meetings. The speaker identification engine 140 is embodied in a plurality of algorithms that perform different functions in this identification process; these algorithms include one or more applications of machine learning algorithms for particular aspects thereof, as discussed further below.

Figure 2:
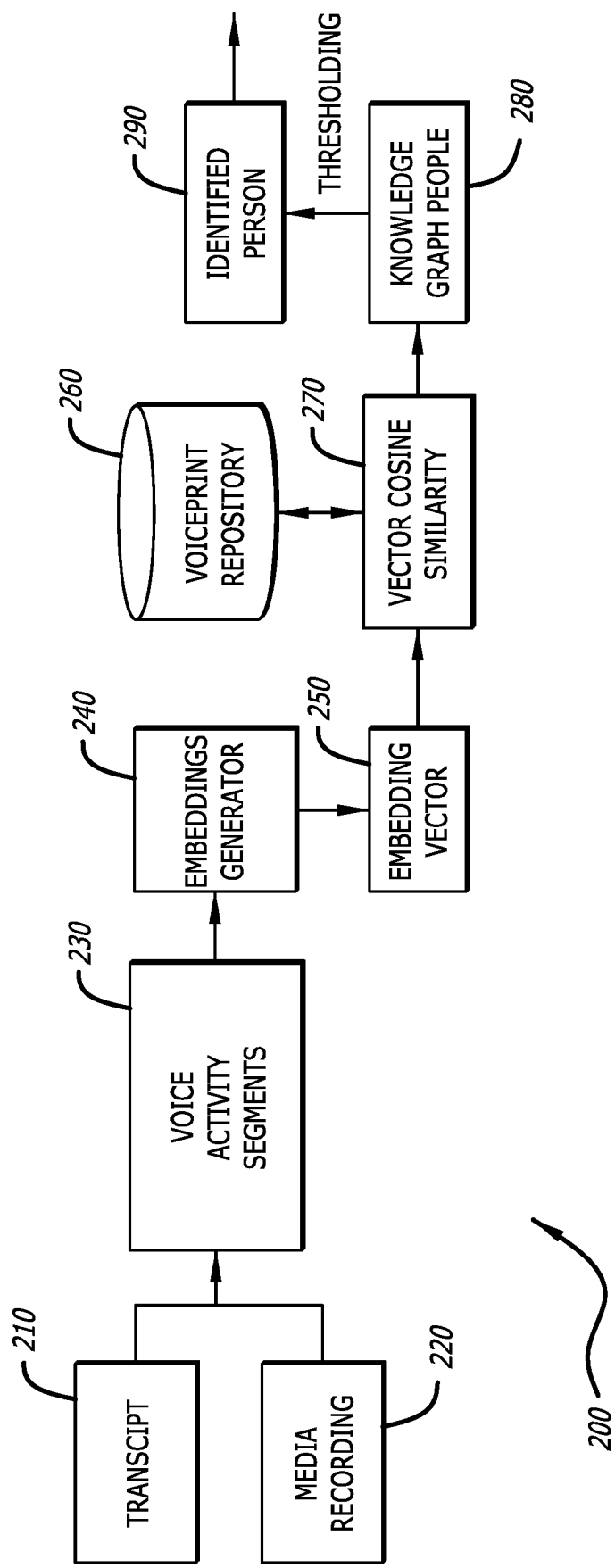
FIG. 2 is a diagram illustrating an exemplary workflow for processing of information for speaker identification, according to another embodiment of the present invention.

FIG. 2 is a diagram of an approach 200 for, and one or more functions in the speaker identification engine 140 for, identifying speakers from audio data and video data of meeting recordings 111 in the input data 110. The approach 200 illustrated in FIG. 2 is performed by one or more of such algorithms, which are designed to match speakers to a collection of embeddings created in an embeddings generator 240, and create a voiceprint repository 260, that represent the voices of speakers. This approach 200 is performed by first retrieving trimmed audio signal snippets for each voice activity segment 230 identified from a transcript 210 of a recording 220 of either a meeting or other file by the transcription and diarization service 130 described above. The embeddings generator 240 identifies one or more features of the voice activity segments 230 and creates embeddings based on those features. An embedding vector 250 is then calculated based on those embeddings for each voice activity segment 230 (or combination of clustered voice activity segments) from the meeting or media recording 220 in the input data 110.

An embedding is a mapping of a discrete variable to a vector of continuous numbers. In neural networks, embeddings are continuous vector representations of these discrete variables. Neural network embeddings reduce the dimensionality of variables, and enable a meaningful representation of variable categories in the transformed space. They also enable the finding of nearest neighbors in the embedding space. Embeddings therefore may be also used for inputs to a machine learning-based AI model 160 for a supervised task that looks for similarities in the embedding space.

In one aspect of this approach 200, the speaker identification engine 140 creates a voiceprint repository 260 from speaker embeddings created by the embeddings generator 240, using neural networks and one or more clustering algorithms, forming n-dimensional vectors representing speaker embeddings for a corpus of speech data. The data modeling and analytics platform 100 applies a neural network to form a latent representation of each audio speech snippet, which outputs a 512-dimensional embedding vector 250. This corpus of embedding vectors 250 then undergo one or more feature selection algorithms to select a subset of salient features in a lower dimensional space (n<=100) that do not impair speaker identification recall. The purpose of dimensionality reduction is to reduce the data storage size of embedding vectors 250 in the voiceprint repository 260.

To perform speaker identification, and in conjunction with the approach 200 of FIG. 2, the SpeakerID engine 130 calculates embedding vectors 250 for each audio speech snippet, using the embeddings created by embeddings generator 140 for the voiceprint repository 260, from features identified and extracted in features generator 132. A cosine similarity search 270 is applied, which calculates a cosine distance between the target embedding and speaker embeddings in the voiceprint repository 260. The results of this cosine similarity search 270 are then thresholded using an implementation of people or knowledge graphs 280 to determine if a match exists.

In a second aspect of this approach 200, the speaker identification engine 140 involves creating a service that returns a speaker identification, or an identified person 290, for a new audio signal or segment (or where no match was previously found), given a number of embeddings for multiple speakers. This aspect finds n candidate points and calculates a cosine distance between unknown embedding and candidates.

In one workflow for this aspect, the speaker identification engine 140 builds an index with known embeddings (or, loads existing data representing these embeddings), and then calibrates a threshold based on an accepted true positive rate and false positive rate using a receiver operating characteristic (ROC) curve. It then ranks and returns the top five candidates according to the calculated cosine distance, and returns all candidates over the threshold.

The speaker identification engine 140 may include one or more opensource libraries or third-party APIs that are used at least for providing the embeddings from speech-to-text conversions generated from audio and video captured by the automated capture system in the data modeling and analytics platform 100, and enabling queries for a new segment for known embeddings and/or with a new index for unknown embeddings. Internal APIs are also used to integrate with information contained in people or knowledge graphs 280 to help decide who the speaker is, by matching to identify the speaker and return an identified person 290.

Facial Recognition/Avatar Processing

The present invention is capable of recognizing faces in video recordings and extracting avatar images of video participants for storage and future recall. Within recordings of meetings from online video chat platforms, screenshots with attendee avatars are captured during the meeting by automatically scrolling the attendees list. Opensource computer vision algorithms (such as those present in the opensource library, OpenCV) are used to identify rectangles representing a participant's avatar image. Further, each avatar image is processed to determine if a human face is present within the image. A bounding box is drawn around the face and an image of the participant's face is extracted and saved.

Online video chat platforms also overlay the participant's display name, number, or electronic mailing address on their avatar. An optical character recognition (OCR) algorithm is used to extract this metadata and attribute it with their saved avatar and extracted face image. Moreover, online video chat platforms apply a border around the active speaker avatar which can be identified using computer vision or through meeting metadata supplied by the video chat platform. This border identifies the active speaker at any given time and enables attribution of the extracted avatar and/or face image with transcript diary entries, knowledge graph entries, and speakers in the voiceprint repository.

For video files 112 recorded outside of an online video chat platform, the facial detection and recognition algorithms described above are applied across video keyframes instead of screenshots of the gallery view of meeting participants.

Extracted avatar and/or face images for each participant may be displayed in the user interface for each speaker entry in the transcription 184. If no avatar is found for a speaker, the data modeling and analytics platform 100 creates an image using initials from the participant's name, if available. If there is no name, then it creates a shape, for example a circle, using a random color as an avatar, to represent that participant. The meeting host may be able to invalidate an identified speaker if the identified person 290 is incorrect and attribute the transcript entry to any other speaker in the system.

Knowledge/People Graphs and Entity Recognition

The data modeling and analytics platform 100 of the present invention includes an application of one or more knowledge graph and entity recognition models 150, which connect and relate incoming data streams in the input data 110 in an easily readable way. Knowledge graphs are approaches to data modeling that are comprised of large amounts of hyper-relational (highly interconnected) data. A knowledge graph model (or just a graph model or graph data model) has two main components—nodes (or vertices) which represent objects, and edges which represent the connections between those nodes and edges. Properties may also be assigned to the nodes and edges to complete the knowledge graph. Knowledge graphs are generally directed graphs. Another way of conceptualizing this is as a directional "subject predicate object" relationship, where the precise semantics of the relationship are encoded.

Graph data models are highly extensible and applicable to many different scenarios where inference is desired. Many sources of data can intersect to form one large knowledge base where several algorithms can bring light to certain patterns, relationships, and general knowledge that would otherwise not be present if the data had remained in separate data collections. Knowledge graphs provide the integrity and inferability of relational databases while maintaining the flexibility of document-based storage methods.

The knowledge graph and entity recognition models 150 in the present invention therefore provide one or more knowledge graphs that enable exploration of connections of between entities. In addition, knowledge graph and entity recognition models 150 act to make the overall data modeling and analytics platform 100 and the analytics performed within it stateful, by remembering people, conversations, and context over time and across different social, consumer, and enterprise environments where users operate. These knowledge graph and entity recognition models 150 may also be associated with one or more APIs that enable the data modeling and analytics platform 100 to insert, update, delete, and copy knowledge graph entities, and to instantiate the relationship edges between the entities.

The knowledge graph and entity recognition models 150 also provide the ability to efficiently store and retrieve artifacts associated with nodes in knowledge graphs for use in machine learning-based AI models 160 that are also part of the present invention. While a knowledge graph itself resembles a database architecture, it is able to easily be augmented with the addition of machine learning capabilities. For example, these knowledge graph and entity recognition models 150 integrates with models of the SpeakerID engine 140, which as noted above generates a "voice-print" that corresponds to a person. These generated "voice-prints" can be compared utilizing an in-memory vector similarity algorithm to confirm that a person in the knowledge graph does indeed match up with the person with a degree of confidence. After this determination is used, a similarity score can assist a matching model to determine if an object (a person, in this case) is already a member of the knowledge graph, or if a new node and relationships should be created.

In a further example, the knowledge graph and entity recognition models 150 integrate with one or more large language models 162 to provide a layer of explainability 186 to outcomes of those large language models 162. This may occur, for example, where a large language model 162 has been utilized in the data modeling and analytics platform 100 to perform some task with regard to the user library 118. Knowledge graphs may augment outcomes of such tasks; for example, where a user interacts with the AI-based agent or bot 198 of the data modeling and analytics platform 100 to analyze the user's meeting recordings 111 to provide a summary of a particular team's discussions on a subject of interest over a set period of time. The knowledge graph and entity recognition models 150 augment this summary with additional information from different data sources in in external data 119 that are relevant to the content in the meeting recordings 111 that were analyzed by the large language model 162.

Knowledge graph and entity recognition models 150 in the data modeling and analytics platform 100 of the present invention may utilize many different types of algorithms and computational components that orchestrate the integration, management, and utilization of the various additional information from different data sources in in external data 119 with the input data 110. Examples of specific types of algorithms that may be utilized in the implementations of graph models in the present invention include data transformation algorithms that convert heterogeneous data formats and structures into a unified representation. These types of algorithms might encompass data normalization, schema mapping, and semantic alignment techniques to ensure consistency across the graph. Another example of a type of algorithm utilized by graph models in the present invention are semantic inference algorithms configured to infer additional knowledge from existing data. These algorithms utilize ontological reasoning, rule-based systems, or as described further below other machine learning models to deduce implicit relationships and facts within the graph.

Still other types of algorithms include incremental update algorithms that enable knowledge graphs to accommodate dynamic data by efficiently adding, modifying, or removing data while preserving graph consistency and minimizing computational overhead. Various other graph algorithms may also be utilized, such as PageRank, community detection, and shortest path algorithms, to enhance the analytical capabilities of graphs models. These algorithms assist in identifying influential nodes, discovering communities of related information, and finding optimal paths within the knowledge graph.

As noted herein, entity recognition is one of functions of implementations of the knowledge graph and entity recognition models 150 in the data modeling and analytics platform 100 of the present invention. Algorithms that enable this function include entity resolution and linking algorithms that perform entity analyses and disambiguate and link related entities across different data sources. These algorithms use techniques like record linkage, entity disambiguation, and semantic similarity measures. Knowledge graphs may also incorporate natural language processing (NLP) techniques for entity recognition, relationship extraction, and sentiment analysis from unstructured text data, to bridge the gap between textual information and structured knowledge.

The above algorithms are some examples of functional tools that allow knowledge graphs to perform the associations of data points extracted from the input data 110 with the information obtained from different data sources in external data 110. Additional algorithms provide structural support for these activities, such query language processing algorithms that handle user queries. Graph query languages like SPARQL or Cypher leverage query optimization techniques retrieve data from large and complex graphs. Additionally, the knowledge graph implementation of the present invention may utilize storage mechanisms that are optimized for graph data structures. Graph databases may utilize indexing, compression, and caching algorithms to efficiently store and retrieve graph data.

These types of technical elements collectively empower knowledge graphs to serve as versatile tools for connecting disparate data sources, extracting meaningful insights, and facilitating informed decision-making. They enable the creation of comprehensive, interconnected data ecosystems that adapt seamlessly to the evolving nature of data and the diverse requirements for data processing and analysis.

Knowledge graphs are data layers, governed by one or more algorithms, that are configured to connect and contextualize disparate data, and are built to capture the ever-changing nature of such data by seamlessly accepting new data and datasets, as well as definitions, and requirements for what to do with such information. In the present invention, knowledge graphs have both front-end (visual) and back-end (computational) components. Specifically as to the computational components, knowledge graphs include software structures that perform functions such as data transformation, storage, and retrieval in multiple layers.

In discrete mathematics, a graph is a network of nodes (vertices) connected by edges. Knowledge graphs are typically labeled and directed versions of such graphs, such that pointers existing from one node to another to define relationship flows. Relations in knowledge graphs may be referred to as 'triples' because they involve three elements: a subject, a predicate, and an object. In a simple example of cows-eat-herbs, similar to common grammar, the subject is cows, the predicate is eat and the object is herbs. In general, the subject and object are both real-world entities (objects, events, situations, concepts) while the predicate connects such objects together.

Knowledge graphs in the present invention are, in one example of their implementation in the software platform 100, realized as universal entity graphs that focus on entity analysis. This occurs through cross-linking, by providing the ability to cross-reference different data sources, for example linking words in news articles with their contextual meaning, and specific types of words with their respective entities across the broader data modeling and analytics platform 100. They also provide the ability to search entities, so as to find different companies, organizations, ideas, and people, and aggregation, allowing the data modeling and analytics platform 100 to run queries to retrieve aggregate statistics across a large dataset of correlated data. Finally, universal entity graphs also allow for investigation, resulting in a deep dive into a specific entity and retrieve information about that entity and other entities related to it.

The knowledge graph and entity recognition models 150 of the data modeling and analytics platform 100 consume and process information from several data sources among the external data 119. These include unstructured data sources that provide primarily full text data. Unstructured data includes news articles, scientific articles, patents, scraped textual data, etc. and is the largest type of data involved in terms of volume. Semi-structured data sources provide data that is available in specific formats or from specific sources, such as documents provided by the Securities Exchange Commission (SEC) of the United States government. Such information may also include metadata in various documents that provide citations and authors, and documents in particular file formats such as excel spreadsheets. Some of this semi-structured data can be scraped, such as where fields are easily extractable but not entirely reliable (LinkedIn, et. al.), while others cannot easily be captured.

Many types of data may be utilized within knowledge graphs, in accordance with analyzing, augmenting, and annotating content in a user library 118 over time. These include people data, such as data collected from the web, from various third-party vendors, from SEC filings, from academic articles, patents, news articles, histories and feeds available from social media platforms such as LinkedIn & Twitter, etc. These also include company data (e.g. products, lines of revenue, acquired companies, sister companies, corporate ownership structures, acquisitions, people, intellectual property, history, etc.), asset and commodity data (e.g. related assets, companies that produce or use these assets, relevant economic hypotheses, etc.), and data relative to cryptocurrencies and digital assets (e.g. people involved, blockchain specifics, investors, etc.)

The implementation of knowledge graph and entity recognition models 150 in the data modeling and analytics platform 100 includes a native full-text search solution to enable nodes and edges, and their properties, to be queried via natural language. This makes it much easier for users of knowledge graphs to find what they are looking for without needing to know a unique identifier or set of unique identifiers for a given object. Additionally, a knowledge graph query system may implement a pipelining library so that multiple queries can be combined in order to bring more likely results to the top of the list. Note that these queries may consist of full text queries in addition to exact property queries (matches, ranges, not equals, set membership, et cetera). The queries can also be weighted differently, i.e. a higher weight multiplier can be assigned to the set of nodes returned by a given query. This query-weighting-scoring methodology is used in a matching engine (described in further detail below) to determine the node or set of nodes that correspond to an incoming document, and if this results in an empty set, it should insert a new node and group of relationships.

The implementation of knowledge graphs and entity recognition models 150 may also include the ability to visualize knowledge graphs in one or more interfaces that compliment natural language interfaces. The data modeling and analytics platform 100 may therefore provide tools for front-end visualization of knowledge graphs as they are built so that users are able to understand, from a visual perspective, interconnections between entities and people as they build their user library 118.

Document-Based Matching in Knowledge Graph and Entity Recognition Models

In implementations of knowledge graphs, given a collection of data to insert into the knowledge graph, it must be determined if the data already exists if and nodes/edges must be updated, or if the data is totally new and nodes/edges must be inserted. This issue is especially relevant for unstructured data including text files, PDF documents, and pieces of binary data like images in image files 116, audio files 113, and video files 112.

Figure 3:
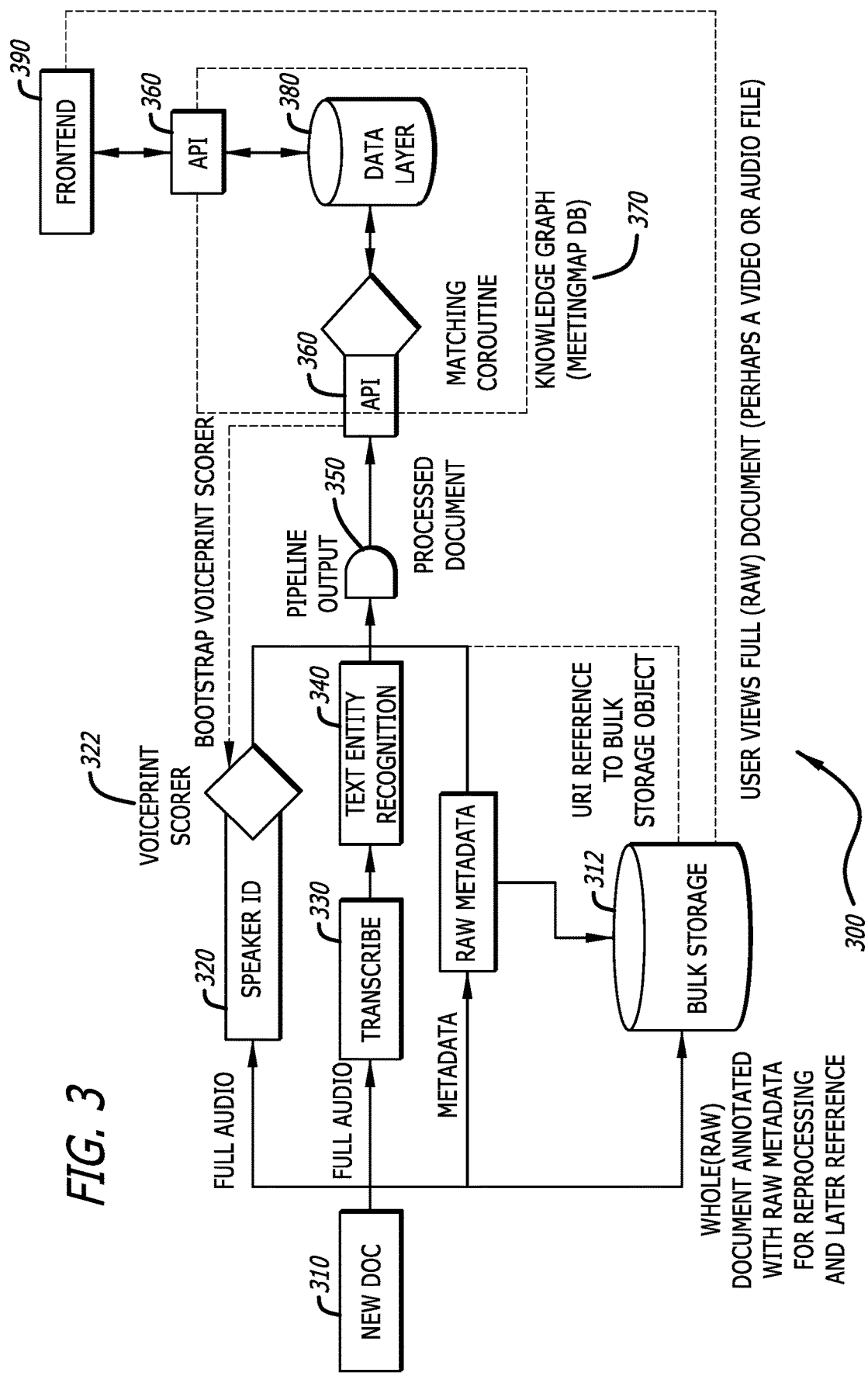
FIG. 3 is a diagram of an exemplary workflow for processing documents within a data modeling and analytics platform according to another embodiment of the present invention.

FIG. 3 is a diagram illustrating document processing in the data modeling and analytics platform 100, and how knowledge graphs fit in, according to one embodiment of the present invention. In FIG. 3 illustrates an exemplary workflow 300, in which the speaker identification engine 140 performs a SpeakerID function 320 and the knowledge graph function 370 instantiated by the one or more knowledge graph and entity recognition models 150 operate together within the data modeling and analytics platform 100 of the present invention.

A "document" in this situation is a collection of one or more pieces of information (being either structured or unstructured) composed in such a way that they are related. In FIG. 3, a new document 310 may be a meeting recording 111; but it is to be understood that generally, a document 310 for the purpose of matching in implementations of knowledge graphs 370 may be any type of record or file comprised of one or more pieces of information. For example, a document 310 may refer to a news article that may have the title (semi-structured), author name (semi-structured), origin website (structured), release date (structured), and article content (unstructured). In data modeling and analytics platform 100 of the present invention and its implementation in analyzing, augmenting, and annotating content over time, a meeting recording 111 may be considered a document 310, the raw meeting metadata a source of structured data, the transcription, video, and audio comprising such a meeting recording 111 a source of unstructured information. Before insertion into the knowledge graph 370 and the insertion or update of any corresponding data, it is the job of the processing pipeline (performed by SpeakerID function 320 and transcribe function 330) to extract as much information from all the components in a given document 310 as possible in a pipeline output 350, so that the knowledge graph 370 can match the data to any existing nodes or edges, organize it, and write it to the database for bulk storage 312.

Referring to FIG. 3, the workflow processes a document 310 to perform SpeakerID functions 320 and transcribe 330 the full audio portion of the file(s) comprising the document 310. The whole document 310, annotated with raw metadata for later re-processing and reference, is stored in a bulk storage database 312. A voice print analysis 322 (which may also be referred to as VoicePrint Scorer) and text entity recognition 340 are performed on the outputs of the SpeakerID function 320 and transcribe function 330 to extract at least some of this raw metadata. From this processing pipeline, the pipeline output 350 is passed to one or more APIs 360 to knowledge graph(s) 370, and maintained in a data layer 390. From there, via another set of one or more APIs 360, users access output data 180 from the workflow 300 on a front-end interface(s) 390 the data modeling and analytics platform 100.

Text Entity Recognition

As noted in FIG. 3, text entity recognition 340 is one element of pipeline processing, and knowledge graphs 370 in the present invention may include a system for utilizing textual processing within the one or more knowledge graph and entity recognition models 150. Unstructured text data comes from a multitude of sources, including articles, papers, patents, and transcriptions of audio from podcasts or videos. The knowledge graph's contribution is taking the data extracted from these sources, and adding edges between the document/meeting and the entities mentioned within the text. For example, given the phrase "Elon Musk" is present in a document, either via a transcription of a meeting or in an article, it should be recognized as a 'person'. Given it is recognized as a person, an edge is established between the Elon Musk (person) node within the knowledge graph 370 and the document 310 itself. Thus, all the entities and concepts within the text itself are represented by the edges pointing from the document 310 to those other nodes. This may be used, for example, to look at the second-degree relationships between Elon Musk and other entities with the full inferential power of all the documents 310 that have been processed via the system.

During the matching process outlined above, the adjacency of the term 'Mon Musk' with other terms that are degree-2 connections of the Elon Musk node (e.g. Twitter, Tesla, Errol Musk) can assist in finding the correct Elon Musk within the knowledge graph. Further, with the addition of other data sources in external data 119, the importance of e.g. Tesla's relationship with Elon Musk would be heightened due to the greater number of pathways available between the Elon Musk node and the Tesla node.

Text entity recognition 340, and integration of knowledge graphs 370, also enables a personalized, multi-agent implementation of the data modeling and analytics platform 100. In one embodiment of the present invention, AI-based agents 198 allow users to train specific AI-based agents 198 on particular topics, and/or using a selected set of the files comprising the user library 118. A user therefore may have a specially-trained medical agent, financial agent, work agent, and personal agent; when a medical bill arrives and is ingested into the data modeling and analytics platform 100, both the user's financial and medical agents may be trained on the new files. When lab results arrive, the user may just train the medical agent. And when speaking with a child, only the personal agent is trained.

Machine Learning Model Integration with Knowledge Graphs

The implementation of knowledge graphs in the data modeling and analytics platform 100 is enhanced by the ability to efficiently store and retrieve artifacts associated with nodes in the knowledge graph for use in conjunction with machine learning-based AI models 160 such as for example large language models 162. While the knowledge graph itself is primarily a data layer architecture, it is able to easily be augmented with the addition of machine learning capabilities, or conversely, augment the outcomes of such AI models 160 by providing explainability 186 layers for results of, for example, semantic searches performed by such large language models 162.

Graph data models leverage a variety of machine learning algorithms to enhance their functionality in knowledge graph implementations involving AI models 160. These algorithms assist in uncovering insights and patterns within interconnected data to enhance performance of AI models 160 such as large language models 162. Machine learning algorithms may be integrated with knowledge graphs for tasks such as entity classification, sentiment analysis, and predictive modeling. Some specific machine learning-based algorithms that may be used include link prediction algorithms, such as node embedding methods, are used to predict missing relationships or edges between entities in the knowledge graph. These algorithms learn representations of nodes (entities) in a way that encodes their structural and semantic properties, enabling the identification of potential connections that may not be explicitly present in the data.

Graph traversal algorithms such as Breadth-First Search (BFS) and Depth-First Search (DFS) may be utilized for graph traversal. These types of algorithms help to navigate the knowledge graph to discover connected entities, uncovering paths and relationships that provide valuable insights into the data. Community detection algorithms, such as Louvain or Modularity-based methods, may also be applied to identify densely-connected clusters or communities within the knowledge graph. These communities often represent groups of related entities or topics, aiding in the organization and categorization of knowledge when applied to an output of a large language model 162 to improve the accuracy of such an output. Centrality algorithms may also be used to determine the importance or influence of nodes within the graph. These may be used to identify key entities or hubs in the knowledge graph, which may be valuable for recommendation systems or understanding the significance of different data points. Algorithms specific to semantic similarity and natural language processing (NLP) techniques enable word embeddings to be integrated with knowledge graphs to capture semantic relationships between entities and textual information. This enables the extraction of knowledge from unstructured text data and its integration into the graph.

Knowledge graph embeddings algorithms may be used to transform entities and relationships into continuous vector representations. These embeddings enable mathematical operations on the graph structure and support various tasks of AI tools such as large language models 162, such as entity classification, relation prediction, and question answering. Other algorithms for specifically improving augmentations of outcomes of the AI-based agent or bot 198 include graph neural networks (GNNs). GNNs are deep learning models designed for graph-structured data. They leverage message passing and aggregation mechanisms to perform tasks like node classification, link prediction, and graph classification. GNNs are examples of tools for linking knowledge graph models and large language models, by incorporating both structural and attribute information from the knowledge graph into the AI models 160.

In another example of an integration of knowledge graphs with machine learning-based models, the SpeakerID engine 140 generates a "voiceprint" that corresponds to a person. These generated "voiceprints" can be compared utilizing an in-memory vector similarity algorithm to confirm that a person in the graph does indeed match up with the person with a degree of confidence. After this determination is used, a similarity score may be generated to assist the aforementioned matching model to come to a determination as to whether an object (person in this case) is already a member of the knowledge graph, or if a new node and relationships should be created.

In still another example of an integration of knowledge graphs with machine learning-based models, workflows for prompts as inputs to large language models 162 may be influenced and modified by applications of knowledge graphs to outputs of such models 162. For example, where a user engages with the data modeling and analytics platform 100 to create a query for the AI-based agent 198 using a semantic or natural language instruction to perform a particular task, the knowledge graph models may analyze the results of such a query in a stateful manner to augment or modify future prompts as specific information is ingested over time. In such an implementation, a population of prompts may evolve as a workflow process or topic conversation using evolutionary mutations as a result of knowledge graph-augmented large language models 162.

The present invention may also be configured to initialize a population of prompt variations for a particular task, and test them to see which perform best. The winners are modified and inserted back into the population of prompt variations. The explainability 186 of the integration of knowledge graph models 150 with AI-based models 160, such as large language models 162, enables such a configuration. For example, where user queries the AI-based agent 198 for a status update on implementation of product testing at markets in a particular state or country, the integration of knowledge graph models 150 and AI-based models 150 may suggest prompt variations for the user over time, as additional meeting recordings 111 and other relevant documents are ingested, to further tune outputs of the AI-based models 162 in a stateful manner.

Example of Operation of Graph Models and Integration with AI Models

Graph models in the software platform 100 of the present invention extract relevant data points from one or more files in the user library 118 representing the body of information of user interest (include a user's meeting records and information in other user-provided records) over time, and construct one or more structured knowledge graphs using these data points. The data points themselves are extracted by applying or more algorithms to identify entities, relationships, and context in those files. In the data modeling and analytics platform 100 of the present invention, the graph models are pointed at all of the files representing the body of information of user interest to examined (for example, where a large language model 162 is tasked with a request to perform a particular task on the body of information of user interest), such as for example emails, text messages, social media posts, documents, videos, audio files, meeting records, etc.

Regardless of the type of files, the graph models may pre-process data in the files to prepare for both analysis and application to the particular problem (in the example above, coupling with AI models 160 such as large language models 162 for explainability 186). This may include tasks such as for example tokenization, lowercasing, and removing punctuation and stop words. Text data may also need cleaning for inconsistencies and errors.

Named entity recognition (NER) algorithms may be utilized to identify and classify entities within the text. Entities can include names of people, organizations, locations, dates, and more. For example, "John Smith" could be recognized as a person entity. After identifying entities, the graph models may apply relation extraction techniques that look for relationships or connections between them within the text. This involves identifying verbs, prepositions, and other linguistic cues that indicate how entities are related. For instance, in the sentence "John Smith works at ABC Corporation," the relationship "works at" can be extracted between "John Smith" and "ABC Corporation."

A temporal analysis may then be performed, particular where the body of information of user interest is a corpus of files over time. Timestamps or date information within the text may provide some temporal context, and such information may therefore be analyzed to understand the chronological order of events or changes related to the user's information.

When entities, relationships, and temporal context have been identified, the data modeling and analytics platform 100 begins to construct the knowledge graph. Each entity becomes a node in the graph, relationships become edges connecting nodes, and time information can be incorporated as attributes on nodes or edges. This structured graph is stateful as it represents the user's evolving information over time; as more files are added to the user's body of information, and more text is analyzed, the graph is added to and expands.

Graphs may also be enhanced by incorporating additional information from different data sources in external data 119, as noted above. This might involve linking entities to external knowledge bases or data sources to gather more attributes and context. For example, linking a company name to an external database may provide details about the company's industry, location, and financial data. Data is then integrated from the different data sources, together with additional temporal data, into the knowledge graph. Once the knowledge graph is constructed, users or applications (via either a search function, or an agent-based semantic/natural language instruction to perform a particular task) query the structured graph to retrieve specific information over time. Queries may be temporal, spatial, or based on entity relationships. For example, a user might enter a query that asks how members of their teams performed over the last month, or what the status is of a particular sales promotion in a specific country over the last two weeks.

Such exemplary queries highlight how a temporal application of knowledge graphs to AI models 160 such as large language models 162 improves the outcome. In such queries, a vector similarity search might not be sufficient when the large language model 162 needs information from multiple documents to generate an answer. The data modeling and analytics platform 100 of the present invention enables accurate answers to such queries, which are known as multi-hop queries because they need information from multiple documents at different times—in other words, where a query requires numerous documents to be analyzed by the large language model 162 to generate an appropriate answer.

Knowledge graphs, as noted above, include structured and unstructured data points, and therefore may be integrated with such AI models 160 in the data modeling and analytics platform 100 to solve the problem of having to examine different documents and having different temporal characteristics, by storing both structured and unstructured data and connecting them with explicit relationships, making information more accessible and easier to find.

Binary Object Retrieval and Matching Engine

The SpeakerID engine 140 provides the ability to 'plug-in' any type of machine learning-based AI model 160 to assist in matching of unstructured binary data in source documents such as audio, video, photos, et cetera. The one or more knowledge graph and entity recognition models 150 are able to take such AI models 160 into consideration as factors when coming to a match determination, and as more data is added, the data modeling and analytics platform 100 generally becomes better at determining with confidence what specifically it is looking at and how it fits into the knowledge graph given a new piece of information.

Summarization

The data modeling and analytics platform 100 of the present invention may also include a summarization engine 171 that includes a plurality of algorithms configured to take long-form text, such as a transcription 184 of a meeting recording 111, and transform it into a summary of conversation. The summarization engine 171 creates, in one aspect thereof, a different set of metadata from the data comprising the meeting record, from which variable-length summaries 181 and/or by-speaker summaries 182 can be generated. The summarization engine 171 is also capable of analyzing, in addition to audio data in the meeting record, additional non-verbal or non-audio conversation elements, such as for example text-based chats within a meeting, and emojis used as forms of expression.

In addition to generating variable-length summaries 181 and by-speaker summaries 182, the summarization engine 171 may utilize algorithms that perform functions such as creating a summary for each meeting, creating a summary for each person, and creating a summary for each topic. The summarization engine 171 may also include an algorithm(s) to create an annotation summary, a keyword summary, a voice-keyword summary, and an emoji summary. Further algorithms may be included for modeling next steps and actionable items identified during a meeting, and for generating multi-meeting summaries, such as those occurring over time or involving the same attendees.

Cold-Start and Other Curation

The data modeling and analytics platform 100 of the present invention may also include a curation engine for curating information to be presented to users, at least in one or more knowledge graphs. The curation engine is capable of generating, in one aspect thereof, a cold-start curation that quickly personalizes a network for a user. This cold-start curation may occur by looking at a particular corpus of content, and having a neural network (or more specifically, a knowledge graph in conjunction with one or more neural networks) learn from the corpus of content to rapidly spin up a network that can be populated with information processed from a meeting recording 111.

Artificial Intelligence-Based Agent

The data modeling and analytics platform 100 of the present invention, as noted above, includes an automated capture system and an associated AI-based agent, or bot, 198 (which may also be referred to herein as "iClerk") that performs functions attendant to automated capture of meeting recordings 111. This AI-based agent 198 captures input data 110 during meetings (the meeting recordings 111) via integration with the host platform's software development kit (SDK) and one or more APIs. The AI-based agent 198 is capable of integrating with any host platform's SDK and APIs (such as Zoom, Google Meet, Microsoft Teams, WebEx, etc.). It is to be noted that the AI-based agent 198 may additionally be capable of such integration without needing a specific API, or having to conform with specific API requirements of such host platforms.

This capture arrangement enables an implementation of the AI-based agent 198 as "one-to-many" personalized iClerks. These personalized iClerks are capable of operating natively on separate devices and/or separate ecosystems, such as for example on mobile computing devices, "smart" phones, earphones or earbuds, on other wearable, internet-enabled devices such watches and eyeglasses, and in automotive platforms. Additionally, each of these personalized iClerks operate under privacy, policy and control guidelines that are configured by the owner.

In the present invention, and in one embodiment thereof, to initiate the AI-based agent 198 to attend a meeting or online interaction on behalf of a user, the user connects their digital calendar, which ingests the user's scheduled calendar events and automatically send their iClerk to each meeting regardless of whether the user attends or not. In the latter case, the user's AI-based agent 198 attends as a representative observer, compiling audio and video recordings, summaries, and insights to present to the user at a later date. However, it is to be understood that other systems and methods of instantiating the automated AI agent 198 in an online meeting are also possible, and within the scope of the present invention. For example, the AI-based agent 198 may be summoned to a meeting through an API call or user interface form by providing the unique digital meeting link and passcode.

The AI-based agent 198 may run on a cloud computing-based container, which is an abstract unit of software that runs a particular workload or process. When instantiated, the AI-based agent 198 simulates the user by joining a meeting. The container hosts the AI-based agent 198, and launches when a meeting occurs. The AI-based agent 198 then begins capturing data as the meeting begins and progresses. The agent 198 captures meeting metadata such as the title, date, start time, end time and time zone, as well as the platform URL hosting the meeting, the list of attendees and their electronic mailing addresses. The bot also has the capability to record audio and video of conversations and presentations, capture screenshots to record images of participants and/or their avatars or names, and record the activity and participation of all people present. It also captures the moments when the host started and ended recording. The bot may also be able to set the display name in the meeting indicating RECORDING when recording the meeting, and may be set to STANDBY in other moments.

Regardless, the data modeling and analytics platform 100 may also capture information in audio files and video files comprising a meeting recording 111 by taking incremental samples during the meeting, and recording both number of samples taken and their duration. The samples are then saved for later post-meeting processing.

After the AI-based agent 198 of the automated capture system records the meeting to a file, this file is then pushed onto an asynchronous priority queue, whereby a chain of processes performed in one or more the data processing modules 124, operating in sequence or in parallel, each perform an idempotent analysis of the input media file in tandem with other external sources of information such as the compiled knowledge graph. These processes include but not limited to media transcoding, transcription, diarization, speaker identification, avatar and face detection, emotion and sentiment/trend/reputation analysis, summarization, and knowledge graph population. Metadata captured in the data collected by the AI-based agent 198 may be stored in knowledge graphs as well. The data and metadata captured by the AI-based agent 198 over time comprises a pool of accumulated information, which may be used to populate a general knowledge base for each organization applying the data modeling and analytics platform 100.

The AI-based agent 198 therefore facilitates generation of output data 180 following conclusion of a meeting. This may include transcriptions 184 and video/audio files of the meeting, which are then made available to those users who summoned an iClerk to record their meeting. Output data 180 may also include generative audio or video (such as for example short audio or video clips 190, and other document and presentation creation, each of which may be templated by vertical market. Other types of output data 180 may include emotion analytics 185, team or participant analytics 187, discussion topics 188, sentiment, trends, and reputation 189, and other analytics 191 (for example, custom analytics desired by the user and requested via an interface from pull-down menus, or via semantic/natural language instruction to the AI-based agent 198). It is to be understood therefore that the owner may be able to configure the output data 180, and reports following a meeting, in many different ways. The owner may, for example, apply settings so that he or she is the only recipient, and may also alternatively enable other meeting participants, and or any parties, to also receive transcriptions 184 and other reporting, video or audio files or clips 190, or any other type of information generated by the data modeling and analytics platform 100. It is to be understood that different levels of outputs are also possible, for example according to a level of platform access or type of product incorporating the AI-based agent 198 purchased by the user, and therefore the present specification is not intended to be limited by any one type of information generated following a meeting.

The AI-based agent 198 may integrate with other, internal APIs, at least for output functions such as transcription 184 of meeting content, annotation of transcribed content with audio and video information, translations 183, populating data collections comprising the knowledge base described above, and for integrating with knowledge graphs.

Workflows for Generative, Templated Outputs

The data modeling and analytics platform 100 may be configured for a large number of generative output workflows that form part of the output data 180. These workflows may be custom workflows designed by users, or may be provided as templated workflows with pre-determined outputs.

Several of the data processing elements 124 may be configured to provide specific outputs for such generative output workflows. These at least include the scoring engine 172, the emotion detection engine 173, the reporting engine 174, and the shorts generation engine 176. Short-segment audio and video clips 190 may be configured around outputs of the emotion, scoring, and reporting engines in templated, generative workflows—for example, enable video or audio clips 190 around changes in scene, animated discussion topics 188, and sentiment, trends, reputation 198 scores.

Emotion Processing

Emotion analytics 185 are one type of output data 180, from which generative output workflows may be configured (in addition to general reporting of such emotion analytics 185). The data modeling and analytics platform 100 also includes, as noted above, an emotion detection engine 173 that is configured to perform a process for identifying emotions of speakers in meeting recordings 111 from both audio and video data (which may include one or both captures of still images, and video streams), comprising those meeting recordings 111, and for enabling augmentation of the transcription 184 of the content with indications of speaker emotions. The emotions detection engine 173 may be embodied in a plurality of algorithms that perform different functions in this process; these algorithms may also include one or more applications of machine learning in models that are utilized to improve outcomes by learning to detect emotion in one or both of audio and video data captured from a meeting recording 111.

In a process of capturing emotion in a meeting recording 111, and for performing emotion analytics 185 on detected emotion, the data modeling and analytics platform 100 captures a meeting recording 111 with the AI-based agent 198 and processes the meeting recording 111 in the transcription and translation service 130 to generate, as noted above, a transcription 184. The transcription 184 is analyzed in the emotion detection engine 173 to discern sentiment at various points in the content, which are indicative of changes in emotion of the speaker of speakers. From the meeting recording 111, voice samples and images of meeting participants are analyzed in the emotion detection engine 173 to discern emotion expressed verbally (using voice-based analytics in the speaker identification engine 140 described above), and to discern emotion in facial expression and body language. These emotions are then aggregated with the sentiments identified in the transcription 184. The emotion detection engine 173 therefore includes an aggregator whose function is at least to normalize the data recorded from voice samples and images, and integrate those different types of data with sentiments identified in transcription 184 of the content.

The data modeling and analytics platform 100 generates a temporal transcript-based sentiment analysis of keywords. When aggregated with emotions identified in voice files and images, the accuracy of the overall sentiment analysis in the transcription 184 of the content is greatly increased, by explaining the 'why' of the emotion expressed. Conversely, emotion capture is also influenced by curated sentiment in the scoring engine 172. Because sentiment keywords are personalized per customer or network, and curated by the scoring engine 172, the accuracy of emotions expressed in audio and video data in a meeting recording 111 may also be confirmed by sentiment analysis.

The processing of voice samples and images of participants may occur, in one aspect of the data modeling and analytics platform 100, as follows. Processing of voice samples in conjunction with sentiment modeling within the scoring engine 172, and in conjunction with processing images, occur within a series of real-time interactions.

In analyzing emotion in voice samples, the present invention analyzes fluctuations or variations in speech across different segments, or periods of time, in which each participant is speaking. This is done by first extracting feature classes from the audio signal for each segment, and then analyzing the feature classes across each segment. Feature classes may include the following features:

start_time:np.array=np.array([ ])

end_time:np.array=np.array([ ])

min_pitch:np.array=np.array([ ])

median_pitch:np.array=np.array([ ])

max_pitch:np.array=np.array([ ])

range_pitch:np.array=np.array([ ])

sd_pitch:np.array=np.array([ ])

median_pitch_velocity:np.array=np.array([ ])

max_pitch_velocity:np.array=np.array([ ])

min_intensity:np.array=np.array([ ])

median_intensity:np.array=np.array([ ])

max_intensity:np.array=np.array([ ])

range_intensity:np.array=np.array([ ])

sd_intensity:np.array=np.array([ ])

median_intensity_velocity:np.array=np.array([ ])

max_intensity_velocity:np.array=np.array([ ])

length_seconds:float=−1 hf500:np.array=np.array([ ])

hf1000:np.array=np.array([ ])

speaker:np.array=np.array([ ])

where hf represents cumulative energy at higher frequencies. The features are analyzed by calculating raw values for each feature, and then applying various statistical algorithms to ascertain whether the raw value indicates a different or non-normal range that may be an indicator of a change in emotion, or the presence of a particular emotion. These indicators may also be used, in an example of a real-time interaction, in conjunction with the image processing portion as discussed below, to provide a signal to capture an image of a participant at that moment, or more frequently for at least a preset period of time.

For image processing, the data modeling and analytics platform 100 may take a picture of every participant dynamically, for example when triggered by a particular action or event. This may include every time pitch rises in speech, or when interruptions happen in speech. This may also occur based on transcribed keywords in real-time, or when certain actions occur such as stop/start of the AI-based agent 198 in the automated capture system, the use of emojis, or upon voice or chat commands or instructions, etc.

Regardless of the trigger, dynamic image capture may reduce the regularity needed for image capture, thereby allowing for a faster processing ratio. Alternatively, image capture in a meeting recording 111 may occur every x seconds (for example, every 10 seconds), and analyzing the expressions in each image (or, changes in images) over time, across multiple images.

It is to be understood that together, the emotion analysis of voice samples and the emotion analysis of images contextualize the sentiment identified in the transcription of the content, to provide insight not only that emotion is being increased, but also what that emotion is.

As noted above, the emotion detection engine 172 may include one or more applications of machine learning in AI models 160. These may include instantiations of neural networks configured to analyze audio and images based on indicators of emotion, and learn how to improve detection of when emotion is being expressed. These neural networks may include both training neural networks, which are trained on datasets comprising expressions of known emotions in one or both of audio and images from a meeting recording 111, as well as production neural networks configured to detect such expressions of particular emotions as newly-captured meeting recordings 111 are ingested into the data modeling and analytics platform 100.

The aggregated output of the emotion detection engine 173 (voice-based emotion detection, together with image-based emotion detection, combined with sentiment analysis in transcription 184) may be used to generate emotion analytics 185 as one type of output data 180. These emotion analytics 185 may include, and be expressed in, a number of ways, for example as follows:
  combined audience emotions by time;
  individual emotions by time;
  individual emotions by participant when the participant is speaking or being quiet;
  speaker influence by estimating audience emotions when a person is speaking;
  as a matrix of person-to-person emotions (i.e. what emotions participant A expresses when participant B is speaking);
  engagement statistics by participant: total speaking time and participation in questions and answers by number of occurrences; averages of the above statistics over the meeting and over the group of meeting for a period of time.

It is to be understood that other approaches to expressing discerned emotions are also possible, and that many other examples of emotion analytics 185 are possible and within the scope of the present invention. Therefore, neither the present specification, the claims, or the present invention are intended to be limited to any one type or manner of output data 180 expressed herein as an example of emotion analytics 185.

Scoring Engine and Sentiment, Trend and Reputation Analysis

The data modeling and analytics platform 100 may also include a scoring engine 172 which applies one or more sentiment analysis algorithms to perform sentiment discovery and attribute a sentiment to the transcription 184 of content from a meeting record or other file. These sentiment analysis algorithms may identify whether keywords are mentioned in a positive manner or in a negative manner in textual content, in relation to one or more sentiment indicators.

A sentiment indicator is a word or expression, taken from a list of such sentiment indicators. This list of sentiment indicators is a collection of words or expressions that may be constructed based on a temporal analysis of meetings for a particular user. For example, for a user involved in securities trading, if a keyword is "price" and a sentiment indicator is "increasing," then it can be classified with a positive sentiment; if the keyword is "cost" however, then the same sentiment indicator would suggest a negative sentiment, and be classified accordingly. After a keyword and sentiment indicator have been found in a text, the sentiment analysis algorithms apply a proximity analysis again to search for an inversion. For example, "bad" is a negative sentiment indicator, while "not bad" is a positive indicator.

Outputs

As noted above, the data modeling and analytics platform 100 may be configured to generate output data that is relative to, and representative of, processed data from a meeting record data. Many types of information may be generated as output data, and therefore the present invention has many potential use cases.

The output data 180 may include actionable outcomes of the data modeling and analytics platform 100, such as for example scheduling and/or arranging a follow-on discussion with a meeting attendee (or anyone else) based on the transcribed content, in a subsequent meeting to which the clerk/bot is automatically invited, or otherwise. Still further, the output data 180 may include actions for taking next steps identified in a meeting; for example, the data modeling and analytics platform 100 may be applied to implement an event, actuate a device, or initiate an activity, in response to next steps discussed during a meeting.

Other possible output use cases of the data modeling and analytics platform 100 include marketing possibilities, search engine optimization, and virality are just some of the potential uses of annotated, augmented transcribed content generated by the data modeling and analytics platform 100. Other, more physical-world outputs that are possible include automatically releasing a product, initiating a physical placement of a product, executing a sale, purchase, or transfer of a product, etc. This may occur, for example, as an outcome of a meeting of a marketing or sales department, where the participants agree that following the meeting, a new product or brand will be launched, or a product or item will be bought or sold. Still other examples include executing an agreement, entering into or terminating an agreement, or negotiating terms of an agreement.

Still other uses cases of the data modeling and analytics platform 100 may include the field of education. It is common, for example, for school board oversight to be strictly governed by state and local law on what has to be discussed, and how it is to be discussed. The data modeling and analytics platform 100 of the present invention may be implemented in such situations to automatically take an action decided upon in the meeting, by for example initiating a hiring or firing of an employee or a vendor. In addition to automating an outcome, the annotated, augmented transcription 184 of the meeting may itself serve as a compliance tool.

It is to be understood that many types of outputs and output data 180 are possible and within the scope of the present invention. Therefore, neither this specification, nor the present invention, shall be limited to any particular output or use case expressed herein.

Neural Networks

In the present invention, and as noted above, the data modeling and analytics platform 100 applies one or more layers of machine learning. The modeling performed in these one or more layers of machine learning may comprise many different types of machine learning, and apply many different mathematical approaches to analyzing information and generating outputs that improve outcomes of the data modeling and analytics platform 100 described herein.

Machine learning modeling may also include, as noted above, applications of neural networks. Neural networks generally are comprised of nodes, which are computational units having one or more biased input/output connections. Such biased connections act as transfer (or activation) functions that combine inputs and outputs in some way. Nodes are organized into multiple layers that form the neural network. There are many types of neural networks, which are computing systems that "learn" to perform tasks in a supervised manner, without being programmed with task-specific rules, based on examples.

Neural networks generally are based on arrays of connected, aggregated nodes (or, "neurons") that transmit signals to each other in the multiple layers over the biased input/output connections. Connections, as noted above, are activation or transfer functions which "fire" these nodes and combine inputs according to mathematical equations or formulas. Different types of neural networks generally have different configurations of these layers of connected, aggregated nodes, but they can generally be described as an input layer, a middle or 'hidden' layer, and an output layer. These layers may perform different transformations on their various inputs, using different mathematical calculations or functions. Signals travel between these layers, from the input layer to the output layer via the middle layer, and may traverse layers, and nodes, multiple times.

Signals are transmitted between nodes over connections, and the output of each node is calculated in a non-linear function that sums all of the inputs to that node. Weight matrices and biases are typically applied to each node, and each connection, and these weights and biases are adjusted as the neural network processes inputs and transmits them across the nodes and connections. These weights represent increases or decreases in the strength of a signal at a particular connection. Additionally, nodes may have a threshold, such that a signal is sent only if the aggregated output at that node crosses that threshold. Weights generally represent how long an activation function takes, while biases represent when, in time, such a function starts; together, they help gradients minimize over time. At least in the case of weights, they can be initialized and change (i.e., decay) over time, as a system learns what weights should be, and how they should be adjusted. In other words, neural networks evolve as they learn, and the mathematical formulas and functions that comprise neural networks design can change over time as a system improves itself.

The application of neural networks within the data modeling and analytics platform 100 may include instantiations of different networks for different purposes. These include both "production" (inferential or generative) neural network(s), utilized to generate output data, and "training" neural network(s), configured to train the production network(s) using improvements on the reasons for prior, historical outcomes that have been learned.

Neural networks can also incorporate a time delay, or feedback loop, which is calculated to generally account for temporal dependencies, to further improve the results of the modeling framework. This may be used by a particular type of neural network that accounts for timed data sequences, such as for example the Long-Short-Term-Memory (LS™) neural network, discussed above. Feedback loops and other time delay mechanisms applied by the various mathematical functions of such a neural network are modeled after one or more temporally-relevant characteristics, and incorporate calculated weights and biases for variables depending on the input data collected and type of problem being analyzed.

Neural networks may be configured to address the problem of decay in longer time-dependent sequences in an architecture that has multiple, interactive components acting as "blocks" in place of the conventional layers of the neural network. Each of these blocks may represent a single layer in a middle layer, or may form multiple layers; regardless, each block may be thought of as representing different timesteps in a time-dependent sequence analysis of input data.

The components of such a specially-focused neural network form its internal state and include a cell, which acts as the memory portion of the block, and three regulating gates that control the flow of information inside each block: an input gate, an output gate, and a forget gate. The cell remembers values over arbitrary time intervals, by keeping track of the dependencies between elements in an input sequence, and the three gates regulate the flow of information into and out of the cell. The input gate controls the extent to which a new value flows into the cell, the forget gate controls the extent to which a value remains in the cell, and the output gate controls the extent to which the value in the cell is used to compute the output of the block. The decision-making function of these gates is often referred to as the logistic sigmoid function for computing outputs of gates in these types of neural networks. There are connections into and out of these gates, and at least the weights of these connections, which need to be learned during training, determine how the gates operate.

Inside neural network blocks, there are additional layers that perform the activation functions needed to ensure that time-dependent data sequences are properly analyzed to avoid decay. One such activation function that may be incorporated is a tanh layer, which effectively classifies input data by determining which input values are added to the internal state of the block. Input gates are a layer of sigmoid-activated nodes whose output is multiplied by inputs classified by preceding tanh layers. The effect of these activation functions is to filter any elements of the inputs that are not required, based on the values assigned to each node for the problem being analyzed, and the weights and biases applied. The weights applied to connections between these nodes can be trained to output values close to zero to switch off certain input values (or, conversely, to pass through other values). Another internal state of a block, the forget gate, is effectively a feedback loop that operates to create a layer of recurrence that further reduces the risk of decay in time-dependent input data. The forget gate helps the neural network learn which state variables should be "remembered" or "forgotten".

Supervised learning is an application of mathematical functions in algorithms that classify input data to find specific relationships or structure therein that allow the machine learning prediction engine to efficiently produce highly accurate output data. There are many types of such algorithms for performing mathematical functions in supervised learning approaches. These include regression analysis (including the logistic regression discussed above, and polynomial regression, and many others), decision trees, Bayesian approaches such as naive Bayes, support vector machines, random forests, anomaly detection, etc.

Recurrent neural networks are a name given to types of neural networks in which connections between nodes follow a directed temporal sequence, allowing the neural network to model temporal dynamic behavior and process sequences of inputs of variable length. These types of neural networks are deployed where there is a need for recognizing, and/or acting on, such sequences. As with neural networks generally, there are many types of recurrent neural networks.

Neural networks having a recurrent architecture may also have stored, or controlled, internal states which permit storage under direct control of the neural network, making them more suitable for inputs having a temporal nature. This storage may be in the form of connections or gates which act as time delays or feedback loops that permit a node or connection to retain data that is prior in time for modeling such temporal dynamic behavior. Such controlled internal states are referred to as gated states or gated memory, and are part of long short-term memory networks (LSTMs) and gated recurrent units (GRUs), which are names of different types of recurrent neural network architectures. This type of neural network design is utilized where desired outputs of a system are motivated by the need for memory, as storage, and as noted above, where the system is designed for processing inputs that are comprised of timed data sequences. Examples of such timed data sequences include video, speech recognition, and handwriting—where processing requires an analysis of data that changes temporally. In the present invention, where output data is in the form of predicted or forecasted future state of some condition, an understanding of the influence of various events on a state over a period of time lead to more highly accurate and reliable predictions or forecasts.

Many other types of recurrent neural networks exist. These include, for example, fully recurrent neural networks, Hopfield networks, bi-directional associative memory networks, echo state networks, neural Turing machines, and many others, all of which exhibit the ability to model temporal dynamic behavior. Any instantiation of such neural networks in the present invention may include one or more of these types, and it is to be understood that neural networks applied within the machine learning prediction engine may include different ones of such types. Therefore, the present invention contemplates that many types of neural networks may be implemented, depending at least on the type of problem being analyzed.

The systems and methods of the present invention may be implemented in many different computing environments. For example, the various algorithms embodied in the data processing elements may each be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of the present invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on a programmed general-purpose computer with the cooperation of a controller and memory, a special purpose computer, a microprocessor, or the like. In these instances, the systems and methods of this invention can be implemented as a program embedded on personal computer such as an applet, JAVA.RTM or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. For example, online user interactions may occur not just during video meetings, but also during in-person meetings that are recorded using devices such as virtual or augmented-reality eyeglasses or Internet-enabled glasses. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method, comprising:
    ingesting input data comprised of one or more files representing at least one business process workflow;
    modeling the input data to analyze a content of the one or more files in one or more machine learning models and execute the one or more business process workflows, the one or more machine learning models configured to:
        extract the content in the one or more files, wherein one or more embeddings are generated from the one or more files,
        create at least one embeddings vector and applying a vector cosine similarity to the at least one embeddings vector, and
        apply one or more knowledge graphs to the content, the one or more knowledge graphs including information from a plurality of external data sources that is integrated with the content one or more files to develop an explainability layer that annotates the content by constructing a structured representation of the content using data points extracted from the one or more files, and associating the data points with particular, domain-specific information inferred from the external data sources that is relative to the content;
    developing one or more domain-specific neural networks from the content, the domain-specific neural networks configured to analyze the structured representation of the content and the domain-specific information inferred from the external data sources;
    augmenting the one or more domain-specific neural networks from the explainability layer over time to create temporal annotations of user-identified information from the one or more files to execute the at least one business process workflow; and
    autonomously extracting the user-identified information from the content in response to one or more prompts of a large language model, wherein the one or more prompts are configured from the content and based on the at least one business process workflow defined within an artificial intelligence-based agent and curated to achieve user-defined outcomes in the at least one business process workflow, and
    executing the at least one business process workflow, the artificial intelligence-based agent automatically assembled to execute the at least one business process workflow based on the user-identified information, wherein the explainability layer enables a traceability in the one or more workflows between the one or more files and the user-defined outcomes, wherein the artificial intelligence-based agent maintains a stateful execution of the at least one business workflow outside of conversational interactions.

2. The method of claim 1, further comprising delivering one or more generative outputs representing the at least one business process workflow, wherein the generative outputs include one or more of short-segment video clips, short-segment audio clips, document, presentations, and reports.

3. The method of claim 1, wherein the one or more files include meeting records representing online user interactions are captured by an the artificial intelligence-based agent, wherein the artificial intelligence-based agent performs an automated capture of the online user interactions, and wherein the meeting records include audio files and one or both of images and video files.

4. The method of claim 3, wherein the artificial intelligence-based agent captures the one or more files from a hosted meeting platform.

5. The method of claim 1, wherein the one or more files further include electronic records of information of user interest for the at least one business process workflow, the electronic records obtained either from a user upload, or an automated capture by instruction from the user, and wherein the electronic records include one or more of audio files, video files, documents, pictures, messages, and websites.

6. The method of claim 1, further comprising identifying one or more emotion analytics in the content, the one or more emotion analytics including mood changes, scene changes, changes in team relationships, and discussion topics in which emotion in one or more participants of the online user interactions is detected.

7. The method of claim 1, wherein the artificial intelligence-based agent engages with the large language model to automatically perform tasks based on the user-identified information associated with the content in response to the one or more prompts to execute the at least one business process workflow.

8. The method of claim 7, wherein the large language model is coupled to the one or more knowledge graphs, the one or more knowledge graphs integrating the particular, domain-specific information from the external data sources that explains outputs of the large language model in the explainability layer.

9. The method of claim 1, further comprising identifying a language in the content, and translating the content into a different language desired by the user.

10. A method, comprising:
    capturing one or more files representing at least one business process workflow within a data modeling and analytics software platform that includes one or more machine learning models, the one or more machine learning models configured to execute the at least one business process workflow by:

extracting a content in the one or more files, wherein one or more embeddings are generated from the one or more files, creating at least one embeddings vector and applying a vector cosine similarity to the at least one embeddings vector, and developing an explainability layer that annotates the content by applying one or more knowledge graphs to the content, the one or more knowledge graphs including information from a plurality of external data sources that is integrated with the content, wherein a structured representation of the content is constructed using data points extracted from the one or more files, and the data points are associated with particular, domain-specific information inferred from the external data sources that is relative to the content;

developing one or more domain-specific neural networks from the content, the domain-specific neural networks configured to analyze the structured representation of the content and the domain-specific information inferred from the external data sources;

augmenting the one or more domain-specific neural networks from the explainability layer over time to create temporal annotations of user-identified information from the one or more files to execute the at least one business process workflow; and autonomously extracting the user-identified information from the content in response to one or more prompts of a large language model, wherein the one or more prompts are configured from the content and based on the at least one business process workflow defined within an artificial intelligence-based agent, and curated to achieve user-defined outcomes in the at least one business process workflow, and executing the at least one business process workflow, the artificial intelligence-based agent automatically assembled to execute the at least one business process workflow based on the user-identified information, wherein the explainability layer enables a traceability in the one or more workflows between the one or more files and the user-defined outcomes, wherein the artificial intelligence-based agent maintains a stateful execution of the at least one business workflow outside of conversational interactions.

11. The method of claim 10, further comprising delivering one or more generative outputs representing the at least one business process workflow, wherein the generative outputs include one or more of short-segment video clips, short-segment audio clips, document, presentations, and reports.

12. The method of claim 10, wherein the one or more files include meeting records representing online user interactions are captured by the artificial intelligence-based agent, wherein the artificial intelligence-based agent performs an automated capture of the online user interactions, and wherein the meeting records include audio files and one or both of images and video files.

13. The method of claim 12, wherein the artificial intelligence-based agent captures the online user interactions from a hosted meeting platform.

14. The method of claim 10, further comprising capturing electronic records of information of user interest for the at least one business process workflow that further comprise the one or more files, the electronic records captured either from a user upload, or an automated capture by instruction from the user, and wherein the electronic records include one or more of audio files, video files, documents, pictures, messages, and websites.

15. The method of claim 10, further comprising identifying one or more emotion analytics in the content, the one or more emotion analytics including mood changes, scene changes, changes in team relationships, and discussion topics in which emotion in one or more participants of the online user interactions is detected.

16. The method of claim 10, wherein the artificial intelligence-based agent engages with the large language model to automatically perform tasks based on the user-identified information associated with the content in response to the one or more prompts to execute the at least one business process workflow.

17. The method of claim 16, wherein the large language model is coupled to the one or more knowledge graphs, the one or more knowledge graphs integrating the particular, domain-specific information from the external data sources that explains outputs of the large language model in the explainability layer.

18. The method of claim 10, further comprising identifying a language in the content, and translating the content into a different language desired by a user.

19. A system, comprising:

an automated capture environment within a data analytics and modeling platform that captures one or more files representing at least one business process workflow;

a plurality of machine learning models that are configured to augment a content in the one or more files to execute the at least one business process workflow;

a diarization service that extracts and analyzes the content in the one or more files, wherein one or more embeddings are generated from the one or more files;

a content identification engine that creates at least one embeddings vector and applies a vector cosine similarity to the at least one embeddings vector;

one or more knowledge graphs that are applied to the content, the one or more knowledge graphs including information from a plurality of external data sources that is integrated with the content in the one or more files to develop an explainability layer that annotates the content by constructing a structured representation of the content using data points extracted from the one or more files, and associating the data points with particular, domain-specific information inferred from the external data sources that is relative to the content;

one or more domain-specific neural networks developed from the content, the domain-specific neural networks configured to analyze the structured representation of the content and the domain-specific information inferred from the external data sources; and an artificial intelligence-based agent that autonomously extracts user-identified information from the content in response to one or more prompts of a large language model, wherein the one or more prompts are configured from the content based on the at least one business process workflow defined within the artificial intelligence-based agent and curated to achieve user-defined outcomes in the at least one business process workflow, the artificial intelligence-based agent automatically assembled to execute the at least one business process workflow based on the user-identified information, wherein the explainability layer enables a traceability in the one or more workflows between the one or more files and the user-defined outcomes, and wherein the one or more domain-specific neural networks are augmented by the explainability layer over time to create temporal annotations of user-identified information from the one or more files to execute the at least one business workflow, wherein the artificial intelligence-based agent maintains a stateful execution of the at least one business workflow outside of conversational interactions.

20. The system of claim 19, wherein one or more generative outputs representing the at least one business process workflow are delivered to the user, the generative outputs including one or more of short-segment video clips, short-segment audio clips, document, presentations, and reports.

21. The system of claim 19, wherein the meeting records representing the online user interactions are captured by the artificial intelligence-based agent, wherein the artificial intelligence-based agent performs an automated capture of the online user interactions, and wherein the meeting records include audio files and one or both of images and video files.

22. The system of claim 21, wherein the artificial intelligence-based agent captures the one or more files from a hosted meeting platform.

23. The system of claim 19, wherein the data analytics and modeling platform further captures electronic records of information of user interest for the at least one business process workflow, the electronic records obtained either from a user upload, or an automated capture by instruction from a user, and wherein the electronic records include one or more of audio files, video files, documents, pictures, messages, and websites.

24. The system of claim 19, further comprising an emotion detection engine that identifies one or more emotion analytics in the content, the one or more emotion analytics including mood changes, scene changes, changes in team relationships, and discussion topics in which emotion in one or more participants of the online user interactions is detected.

25. The system of claim 19, wherein the artificial intelligence-based agent engages with the large language model to automatically perform tasks based on the user-identified information associated with the content in response to the one or more prompts to execute the at least one business process workflow.

26. The system of claim 25, wherein the large language model is coupled to the one or more knowledge graphs, the one or more knowledge graphs integrating the particular, domain-specific information from the external data sources that explains outputs of the large language model in the explainability layer.

27. The system of claim 19, wherein the diarization service identifies a language in the content, and translates the content into a different language desired by the user.

* * * * *